Sept. 11, 1962 W. H. MASHINTER 3,053,187
VARIABLE OUTPUT PUMP
Filed Nov. 9, 1959 2 Sheets-Sheet 2
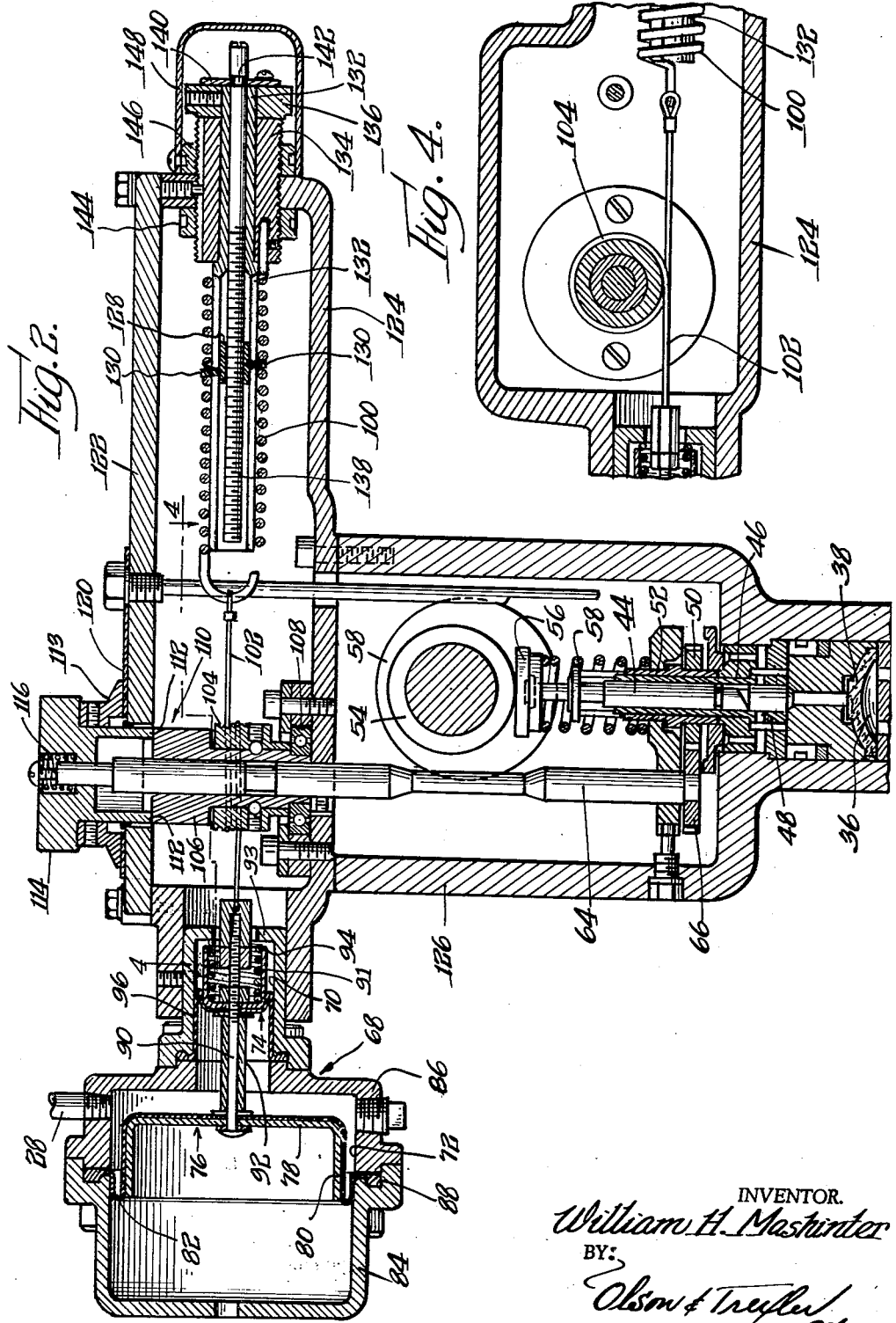
INVENTOR.
William H. Mashinter
BY:
Olson & Trexler
attys.

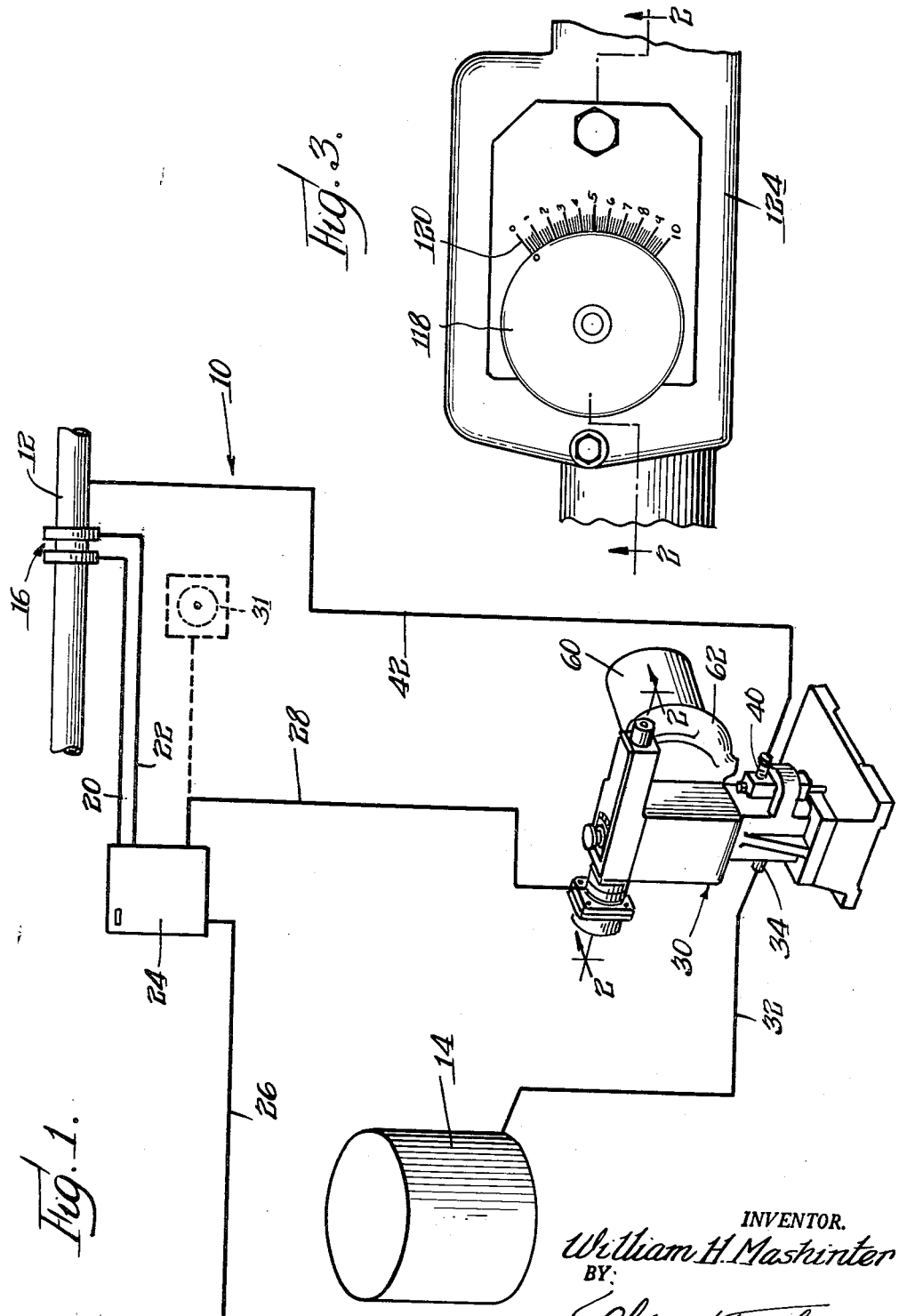

United States Patent Office 3,053,187
Patented Sept. 11, 1962

3,053,187
VARIABLE OUTPUT PUMP
William H. Mashinter, Palatine, Ill., assignor to Hills-McCanna Company, Chicago, Ill., a corporation of Illinois
Filed Nov. 9, 1959, Ser. No. 851,688
14 Claims. (Cl. 103—38)

The present invention relates to liquid proportioning and blending systems and more particularly to variable output pumping means usable in such systems to supply a fluid additive to a fluid medium flowing through a conduit or the like. Fluid proportioning or blending systems of this character are used by utility companies, for example, to supply a small quantity of odorant to natural gas that is distributed for general use. Since natural gas is toxic and substantially odorless, an odorant is added to the gas at a ratio of only a few parts per million to enable persons exposed to escaping gas to detect the presence of the gas by their sense of smell.

The problem of adding the desired amount of odorant to natural gas is complicated by a number of factors which include (1) the extremely low ratio of the odorant additive to the gas, (2) the fact that the odorant itself has a toxic character making it necessary to maintain an accurate proportioning of the odorant to the gas to avoid producing a hazardous mixture of odorant and gas, and (3) the fluctuating rate at which gas characteristically flows through the conduits or mains into which the odorant is added.

The problems involved in supplying an odorant additive to natural gas in a public utility system are also encountered in other environments where a fluid additive, such as a catalyst, chemical inhibitor, detergent or the like is supplied to a fluid medium to provide a predetermined ratio or proportioning of the additive to the fluid medium.

One object of the invention is to provide variable output pumping means well adapted for use in fluid proportioning and blending systems of the above character and having a new and improved construction which provides a precise automatic control of the instantaneous output rate of the pumping means to conform with a high degree of accuracy to the instantaneous pressure of a control fluid supplied to control the pumping means.

Another object is to provide new and improved variable output pumping means in which the instantaneous output rate of the pumping means is controlled in response to the pressure of a fluid control medium by operation of new and improved motor and transmission means incorporated into the pumping means in a manner which responds to incremental changes in the pressure of the control fluid to produce incremental variations in the pumping output rate which are directly and precisely proportional to the incremental pressure changes.

A further object is to provide a variable output pump with improved fluid pressure responsive control means in which frictional resistance to operation of the control means in response to incremental changes in the control pressure is virtually eliminated.

Another object is to provide a variable output pump incorporating improved fluid pressure responsive control means in which a rotary pump control element is precisely and continuously positioned rotatably by substantially pure torque developed and applied to the control element by pressure responsive fluid motor and transmission means in which contact of components that move relative to each other is obviated to avoid friction, thus effectively eliminating any lag in the responsiveness of the pump control to either increases or decreases in the fluid control pressure.

A further object is to provide a variable output pump incorporating improved and highly advantageous control means, as recited in the above objects, which is readily adjustable to an infinite number of settings to accommodate the control to different pressure ranges of the control fluid or to adjust the operating range of the pump through which the pumping rate is varied by a given range of pressure of the control fluid.

Another object is to provide variable output pumping structure incorporating automatic, pressure responsive control means of the character recited in a manner which provides for manually controlling the pumping rate independently of the automatic operation of the pressure responsive control means.

A related object is to provide improved variable output pumping means, as recited in the preceding objects, which continuously indicates the instantaneous pumping rate during either automatic or manual control of the pumping rate.

Other objects and advantages will be evident from the following description of the exemplary form of the invention illustrated in the drawings, in which:

FIGURE 1 is a perspective view of an automatically controlled system for supplying an odorant to a stream of gas and incorporating the exemplary embodiment of the invention;

FIG. 2 is a vertical sectional view of the automatically controlled pumping means, taken generally along the plane indicated by the lines 2—2 in FIGS. 1 and 3.

FIG. 3 is a fragmentary plan view of the central portion of the pumping means as viewed from above, with reference to FIG. 2; and FIG. 4 is a fragmentary sectional view taken along the line 4—4 of FIG. 2.

Having reference to the drawings in greater detail, the liquid proportioning or blending system 10 illustrated largely schematically in FIG. 1 is designed for use in a public utility system to supply an odorant as an additive to natural gas flowing at a varying rate through a main 12. A supply of liquid odorant is provided in a reservoir or tank 14.

As will presently appear, the blending system 10 operates to supply odorant to the gas flowing through the main 12 at an instantaneous rate which is directly proportional to the instantaneous rate of gas flow in the main.

To determine the instantaneous rate of gas flow in the main 12, a flow restrictive device 16 is placed in the main 12 to produce in two connecting tubes 20, 22 a differential pressure which varies in a well known manner in accordance with the flow rate of the stream of gas in the main.

The differential pressure in the tubes 20, 22 is used to control operation of a flow transmitter 24 which modulates the pressure of a fluid control medium, supplied to the transmitter through a line 26, to supply the fluid control medium to an output line 28 under an instantaneous pressure, within a predetermined pressure range, which is directly proportional to the rate of gas flow in the main 12. The flow transmitter 24 itself is of a well known commercial construction requiring no description here. However, it may be noted that the operating characteristics of the flow transmitter are such that it determines a square root function of the instantaneous differential pressure in the tubes 20, 22 and operates through precise and intricate valve control means to supply a control fluid to the output line 28 under a pressure; which, as explained, is directly proportional within a control pressure range to the gas flow rate within the main 12.

Typically, control air is supplied to the transmitter 24 through the line 26 under a continuous pressure of twenty pounds per square inch. The output pressure of air as supplied by the transmitter to the line 28 varies from three to fifteen pounds per square inch, the three pounds minimum pressure corresponding to a stoppage or zero rate of gas flow in the main 12 and the fifteen pounds pressure corresponding to the maximum rate at which gas flows through the main 12.

The deodorant additive is pumped from the supply reservoir 14 into the gas main 12 by new and improved, variable output pumping means 30 which provides an instantaneous volumetric output rate that is directly proportional to the degree to which the control pressure in the line 28 exceeds its minimum value, corresponding to a zero flow rate in the main 12.

As shown in FIG. 1, the deodorant reservoir 14 is connected through a conduit 32 and an intake check valve 34 with a pumping chamber 36, FIG. 2, which is alternately contracted and expanded by a diaphragm 38 to force the fluid deodorant out through a check valve 40 and a conduit 42, FIG. 1, into the gas main 12. The diaphragm 38 is operated to contract and expand the pumping chamber 36 by pulsating hydraulic pressure applied to the side of the diaphragm opposite the pumping chamber 36 by means of a reciprocating plunger 44 operating in a ported sleeve cylinder 46.

The hydraulic structure inclding the plunger 44 and the sleeve 46 which hydraulically actuates the diaphragm 38 is constructed in accordance with the teachings of United States Letters Patent No. 2,636,439, issued April 28, 1953, to W. H. Mashinter, the applicant here. Reference may be made to that patent for a more detailed description of pumping structure disclosed in this application.

As shown in FIG. 2, the pumping end of the plunger 44 is inclined and shaped to cooperate with hydraulic circulating bores 48 in the sleeve 46 to determine the portion of the displacement of the plunger which is hydraulically effective to actuate the diaphragm 38. The hydraulically effective displacement of the plunger 44, and hence the range of movement of the diaphragm 38 is controllably varied by adjusting the plunger 44 and the sleeve 46 rotatably in relation to each other.

Rotation of the plunger 44 relative to the ported sleeve 46 for the purpose of varying the effective hydraulic displacement of the plunger and the volume of odorant pumped for each stroke of the plunger is effected by means of a gear 50 connected to rotate the plunger through a quill shaft 52 encircling the sleeve 46 as shown in FIG. 2.

Reciprocation of the plunger 44 at a constant, predetermined speed is effected by means of an eccentric actuator 54 opposing an operating head 56 on the plunger, which is continuously urged into firm engagement with the eccentric actuator by a compression spring 58. The eccentric actuator 54 is carried and operated by a drive shaft 58 powered by an electric motor 60 through a speed reducer 62, FIGS. 1 and 2.

The pumping structure thus described is exceptionally well suited to pump the fluid deodorant at a very precise rate which can be accurately controlled by a rotary control shaft or element 64 connected by a gear 66 with the pump control gear 50. The control element 64 operates through the gear 66 and the gear 50 to determine the relative positions of components of pumping rate varying means incorporated into the pumping structure and including the plunger 44 and sleeve 46.

The instantaneous rotary position of the pump control 64 and hence the instantaneous rate at which odorant is supplied to the gas main 12 is made to continuously conform with a high degree of accuracy to the instantaneous control pressure in the control conduit 28 by new and improved means which responds to even a minute incremental change in the pressure of the control fluid to effect a corresponding and accurately proportional change in the rotary position of the control element 64.

For this purpose, the control fluid in the line 28 is connected to a reciprocable fluid motor 68, FIG. 2, providing a substantial range of motion and a linear output force directly proportional to the pressure of the control fluid, and having a construction which eliminates contact between component elements which move relative to each other thus virtually eliminating frictional resistance in the motor to response of the motor to incremental changes in the control fluid pressure.

Structurally, the fluid motor 68 comprises two differential cylinders 70, 72 disposed and connected in coaxial relation to each other, with the smaller cylinder 70 located between the larger cylinder 72 and the control shaft 64, as shown in FIG. 2. As will presently appear, the differential cylinders 70, 72 have a common axis which is perpendicular to and laterally offset somewhat from the control shaft 64.

Two interconnected differential pistons 74, 76 somewhat smaller in diameter than the respective cylinders 70, 72 are floatingly supported within the latter by means which provides impervious seals between the pistons and cylinders, while at the same time avoiding frictional contact between components of the motor 68 which move relative to each other.

The two pistons 74, 76 are of similar construction, the piston 76 comprising a transverse disk 78 which merges at its outer periphery with a cylindrical skirt 80 radially spaced a substantial distance inwardly from the surrounding wall of the cylinder 72 and having a length which slightly exceeds the overall linear movement of the pistons within the cylinders. Radial support is provided to the piston 76 by a pliable support and sealing element 82 having a circular shape, as viewed from one end of the piston, which extends transversely across the side of the disk 78 facing the smaller piston 74. The circumferential marginal edge of the flexible support and sealing element 82 extends radially beyond the piston 78 and is firmly clamped between two component sections 84, 86 of housing structure defining the cylinder 72. Preferably, the periphery of the support and sealing element 82 is thickened to form a bead 88 which is clamped between the housing sections 84, 86 at an axial location along the cylinder 72 alined with the medial portion of the stroke of the piston 76.

The circumferential portion of the pliable support and sealing element 82, which extends radially between the piston 76 and the encircling cylinder, has a generally cylindrical shape adapted to fit around the skirt and has an axial length which exceeds that of the piston skirt 80 sufficiently to extend the length of the piston skirt and double back along the wall of the cylinder 72 to the supported bead 88, as shown.

The two pistons 74, 76 are connected together by a tie rod 90, and a spacer sleeve 92 coaxial with the pistons.

The structure of the smaller piston 74 which is similar to that of the larger piston described, includes a cylindrical skirt 94 extending away from the piston 76. The smaller piston 74 is radially supported and sealed to the inner wall of the cylinder 70 by a pliable support and sealing element 96 similar to the previously described support and sealing element 82 for the larger piston. The pistons 74 and 76 are continuously urged to the left, FIG.

2, in the direction of the larger piston 76, by a spring 91 interposed between the piston 74 and an inwardly protruding lip 93 on the inner end of the cylinder 70, as shown in FIG. 2.

As shown in FIG. 2, the conduit 28 is connected to communicate with both cylinders 70 and 72 between the two opposed differential pistons 74, 76. The pressure of the control fluid as applied to the differential pistons produces a linear pressure force along the common axis of the two pistons which acts in a direction away from the control shaft 64.

This linear pressure force is opposed by a graduated, helical tension spring 100 mounted beyond the opposite side of the control shaft 64 from the pistons in coaxial relation to the pistons, as shown in FIGS. 2 and 4. As will presently appear, the differential pistons are interconnected with the graduated spring 100 in a manner such that the overall resultant fluid pressure force on the two pistons acts in a linear direction in direct opposition to the force of the spring 100 in resisting elongation by operation of the pistons. This is significant in avoiding the application of radial forces to the pistons, either by fluid pressure or by transmitted forces from the spring 100, which would induce friction tending to resist axial movement of the pistons. In operation, the connected differential pistons move against the spring 100 elongating the spring until equilibrium is established between the force of the spring and the differential fluid force on the pistons.

Movement of the pistons to effect a continuing equilibrium between the fluid force on the pistons and the restraining force of the spring 100 is translated into rotary movement of the control shaft 64 by transmission means which effects turning movement of the control shaft by substantially pure torque developed and applied to the shaft in a manner which effectively avoids the application of bearing forces between component parts of the structure which move relative to each other.

Thus, rotation of the shaft 64 by linear displacement of the pistons 74, 76 is effected by means of a cable 102 extending around a cable drum element 104 encircling the control shaft 64 in tangential relation to the common axis of the differential pistons about which the spring 100 is concentric. The cable 102 extends around the drum 104 for only one complete turn and has opposite ends extending in opposite directions from the periphery of the drum along a common tangent to the drum periphery which coincides with the common axis of the pistons.

Opposite ends of the cable connect respectively to the adjacent end of the spring 100 and to the tie rod 90 between the two pistons. Since the two projecting ends of the cable 102 are parallel and almost coaxial, the tension forces in the cable as applied to the drum 104 act in direct opposition to each other to avoid the application of any significant resultant force to the drum 104 other than a force sufficient to rotate the drum upon movement of the pistons in either direction.

The drum element 104 is nonrotatably mounted on a quill element 106 journalled in an antifriction bearing 108 in encircling relation to the control shaft 64. The antifriction bearing 108 is employed largely to provide positional stability of the component parts relative to each and is not subject to any significant radial load, since the tension forces applied to the drum element 104 through the alined ends of the cable 102 balance each other, as previously explained.

To provide for manual control of the instantaneous output rate of the pumping means 30 independently of operation of the fluid pressure automatic control, the quill element 106 is connected to rotate the control shaft 64 through a dog clutch 110 which provides for manual disengagement of the drum element 104 from the control shaft 64 and manual rotation of the control shaft independently of the operation of the differential pistons 74, 76. For this purpose, the end of the quill element 106 opposite from the bearing 108 is notched to receive tangs 112 on a driven clutch element 114 nonrotatably mounted on the adjacent end of the shaft 64 for axial movement by a compression spring 116 into engagement with the quill element. Thus, the element 114 forms the driven element of the clutch 110, which is shaped into a knob adapted to be manually grasped and moved axially to disengage the clutch 110 and rotated manually to control the pumping rate.

A reference dial 118 fixed to the output clutch element 114, as shown in FIG. 2, cooperates with an arcuate scale 120 to provide a continuous visual indication of the exact rotary position of the shaft 64 and hence the instantaneous output rate of the pumping means 30 when the latter is controlled either manually or automatically. It may be noted that the scale 120 is supported on a cover plate 122 on a transversely elongated housing 124 for the control structure which, as shown, surmounts the housing 126 for the previously described pumping assembly.

Provision is made for infinitely varying the effective strength or spring constant of the helical tension spring 100 to accommodate the automatic pump control to different ranges in the effective pressure of the fluid supplied to the differential cylinders 70, 72 for controlling the pumping rate. Moreover, as will presently appear, the provision made for effecting adjustment of the overall spring constant of the spring 100 to any one of an infinite number of values within a wide range of adjustment is of great advantage in adjusting the effective range through which the pumping rate is varied by any given pressure range of the control fluid.

The effective spring constant of the spring 100 is adjusted by means of a spring anchoring element 128 located within the spring, as shown, and including anchoring lugs 130 projecting radially outward in the interstices between adjacent turns of the spring. To vary the effective length of the spring between the anchoring element 128 and the cable end of the spring, and hence the effective strength or spring constant of the spring, the anchoring element 128 is rotated in relation to the spring to translate the anchoring element longitudinally relative to the spring. Rotation of the anchoring element 128 relative to the spring 100 is effected by means of a longitudinally split, axial sleeve 132 rotatably mounted within the spring to extend along the length thereof and project from the end of the spring more remote from the cable 102, as shown in FIG. 2.

The outwardly projecting end of the sleeve 132 extends through an anchoring sleeve 134 adjustably mounted in one end of the housing 124, as will presently appear. Rotation of the anchoring element adjusting sleeve 132 is effected by a radially enlarged part 136 fixed to the end of the sleeve 132 which projects beyond the support sleeve 134.

The spring anchoring element 128 is supported against longitudinal displacement by a threaded rod 138 extending axially through the sleeve 132 and threaded through the anchoring element. The rod 138 itself is supported against longitudinal displacement by an anchoring blade 140 pivotally supported on the element 136 for swinging movement into and out of engagement with a notch 142 in the rod.

The outer sleeve 134, which provides axial support to the spring anchoring element 128 through the element 136, the blade 140, and rod 138, is adjustable axially in relation to the housing 124 to provide course axial adjustment of the position of the spring anchoring element. For this purpose, the outer sleeve 134 is externally threaded to support two adjusting nuts 144, 146 opposing opposite sides of an intervening portion of the housing 124 as shown in FIG. 2. The outer nut 146 is normally covered by a removable cap 148 encasing the projecting end of the support structure including the elements 132, 136, 140 and 142. Removal of the cap 148 and turning of the housing cover 122 to one side makes both adjusting nuts 144, 146 accessible for effecting a course longitudinal adjustment of the spring anchor 128. Fine adjustment of the longitudinal position of the spring anchor 128 is effected by rotating the anchor rod 138, which is threaded into the anchor element and supported longitudinally by the swingable blade 140.

The automatically controlled pump just described can be readily adjusted to vary its output rate through a desired range in response to variation of the pressure of the control fluid through a predetermined pressure range. This is accomplished by adjusting the longitudinal position of the spring anchor 128 with respect to the spring 100 to vary the effective length and strength of the spring as described, and by adjusting the longitudinal position of the spring anchor with respect to the housing 124, by means of the course and fine adjustment described, to effect an equilibrium between the force of the spring and the differential pressure force on the pistons 70, 72 which locates the control shaft 64 in a rotary position corresponding to a zero pumping rate when the pressure of the control fluid applied to the differential pistons corresponds to a zero rate of fluid flow to the line 12.

With reference to the previously mentioned exemplary pressure values, the spring anchor 128 is positioned longitudinally with respect to the housing 124 to locate the shaft 64 in its zero pumping rate position, as indicated by the zero position of the dial 128 with reference to the scale 120, FIG. 3, when fluid under a pressure of 3 pounds per square inch is supplied to the differential cylinders 70, 72. The spring anchor element 128 is rotated either to shorten or lengthen the effective portion of the spring 100 to achieve a rotary displacement of the control shaft 64 to a position which effects a maximum pumping rate when fluid is supplied to the cylinders 70, 72 under a pressure of 15 pounds per square inch. Thus, by making successive adjustments, the longitudinal position of the spring anchor element 128 in relation to both the housing 124 and the spring 100 it is possible to adapt the automatic control to different pressure ranges of the control fluid.

Moreover, the automatically controlled pump thus provided can be readily adjusted to vary the volumetric output range through which the pumping rate is varied in response to a given pressure range of the control fluid for the purpose of varying the proportioning of the odorant added to gas flowing in the main 12 in relation to the volume of gas passing through the main. Thus, in order to reduce the concentration of odorant in the gas flowing through the main 12, it is necessary merely to increase the effective spring constant of the spring 100 by adjusting the anchoring element 128 longitudinally with respect to the spring 100 to reduce the angular displacement, and hence the degree to which the pumping rate is increased in respone to an increase in pressure of the control fluid as supplied from 3 to 15 pounds per square inch. It will be understood that the longitudinal position of the spring anchor 128 is adjusted in relation to the housing 124 to effect a "zero" calibration of the control after each longitudinal adjustment of the spring anchor in relation to the spring.

After adjustment to reduce the maximum pumping rate of the odorant supplying unit corresponding to a maximum rate of gas flow to the main through the line 12, the automatically controlled unit operates to maintain a constant ratio between the volumetric rate of the gas flow to the volumetric rate at which odorant is added to the gas. In a similar manner the concentration of odorant in the gas can be increased by adjusting the spring anchor element 128 to reduce the spring constant of the spring 100.

It will be appreciated that the invention is not necessarily limited to the exemplary embodiment illustrated, but includes variants and alternatives within the spirit and scope of the invention as defined by the claims.

The invention is claimed as follows:

1. A fluid pressure responsive, variable rate pump comprising, in combination, a rotary pump control element, means for pumping fluid at an adjustable rate determined by the instantaneous rotary position of said control element, a rotary drum element connected to rotate said control element, a control cable wound around said drum and having opposite ends projecting in opposite directions therefrom, a tension spring connected to one end of said cable to form a yieldable anchor therefor, means defining two generally concentric connected cylinders of unequal diameters, two connected pistons disposed in said respective cylinders and having skirted portions extending away from each other, said pistons including said skirted portions thereof having diameters somewhat less than said respective cylinders, two flexible sealing elements extending transversely across said respective pistons and having marginal edges circumferentially anchored and sealed to said means defining said respective cylinders, each of said sealing elements including a generally cylindrical portion adapted to encircle and extend along the length of the skirt portion of the adjacent piston, means for supplying control fluid under pressure to both said cylinders between said pistons to produce a differential pressure force on the pistons, and means connecting said pistons to the other end of said cable to apply to the latter the differential fluid pressure force on said pistons to effect rotation of said drum and said pump control element to an instantaneous position in which an equilibrium is established between the force of said pistons and the force of said spring acting on said cable.

2. A variable output pump controlled in accordance with the instantaneous pressure of a fluid control medium and comprising, in combination, means defining two coaxial cylinders of unequal diameters communicating directly with each other, two connected pistons disposed in said respective cylinders and being somewhat smaller in diameter than said respective cylinders, each of said pistons defining a cylindrical skirt thereon extending away from the other piston, two flexible sealing elements of generally cylindrical form encircling said respective piston skirts to extend axially therealong, one end of each of said sealing elements being circumferentially secured and sealed to the means defining the associated cylinder, the other end of each of said sealing elements merging with transverse sealing means extending across the associated pistons, means for supplying control fluid under pressure to said cylinders between said pistons to exert a differential pressure force on the two pistons, a rotary drum antifriction bearing means supporting said drum in tangential relation to the extended common axis of said cylinders at a location at the end of the smaller cylinder opposite from the larger cylinder, a cable extending around said drum and having opposite ends extending in opposite directions from the periphery thereof along the extended common axes of said cylinders, means connecting said pistons to the adjacent end of said cable to apply to said cable the differential force of fluid pressure on said pistons, a helical tension spring located at the side of said drum opposite from said pistons in substantially concentric parallel alignment with the common axis of said cylinders, means connecting said spring to the other end of said cable, an adjustable anchor connected to said spring to adjust the anchored end of the spring along said common axis, a rotary pump adjusting element connected for rotation by said drum, and a variable output pump connected to be controlled by said control element.

3. A variable output pump having an instantaneous pumping rate controlled in accordance with the pressure of a fluid control medium, comprising, in combination, a variable output pumping assembly including rate varying means for adjustably determining the output rate of the pumping assembly, a rotary control element connected to said rate varying means to determine the output rate of said pumping assembly in accordance with the rotary position of said control element, a rotary drum, a clutch normally connecting said drum to said control element, said clutch including a driven element connected to rotate said control element and manually operable to disengage the clutch while at the same time providing for rotation of said control element by manual rotation of said driven element, an operating cable extending around said drum and having opposite ends extending in opposite directions from the drum along a common tangent to the periphery thereof, an anchoring spring connected to one end of said cable, a fluid actuator including differential pistons having floating mounts in connected cylinders of unequal size, and means connecting said pistons to the other end of said cable to rotate said drum against the restraining force of said spring.

4. A variable output pump controlled by the pressure of a fluid control medium and comprising, in combination, a pumping element, means including a reciprocable plunger for hydraulically actuating said pumping element, porting means coacting with said plunger to determine the hydraulically effective length of the stroke thereof, means including a rotary control element for adjusting said porting means and said plunger in relation to each other to control the hydraulically effective length of the plunger stroke, a rotary drum element coaxial with said control element, a manually disengageable clutch normally connecting said drum element to said control element, means for manually rotating said control-element with said clutch disengaged, an actuating cable encircling said drum and having opposite ends extending in opposite directions from the periphery thereof along a common tangent thereto, a helical tension spring connected to one end of said cable and extending therefrom along said common tangent, a spring anchor projecting into an interstice between adjacent turns of said spring to anchor the latter, means for rotating said anchor in relation to said spring to progress said anchor along said spring to vary the effective length of the spring between said anchor and said cable, course adjusting means for adjusting the position of said anchor along said tangent, fine adjusting means for adjusting the position of said anchor along said tangent, two differential pistons connected to the other end of said cable in concentric relation to said tangent, differential cylinders receiving said respective pistons, means floatingly supporting said pistons within said cylinders, and means for directing a fluid control medium into said cylinders between said pistons to exert on the latter a differential pressure force which is applied through said cable in opposition to said spring to locate said control element in a rotary position corresponding to the pressure of said fluid medium.

5. In a variable output pump, the combination of a rotatable control element, variable pumping means controlled by said control element, a drum element, a driving clutch element connected to said drum element, a driven clutch element connected to said control element and biased axially into engagement with said driving clutch element, handle means on said driven clutch element for disengaging the latter from said driving clutch element and rotating said control element independently of said drum element, rotary position indicator means connected with said control element, antifriction bearing means supporting said drum element, cable means encircling said drum element and having opposite ends extending in opposite directions from the periphery thereof along a common tangent thereto, a helical spring connected to one end of said cable and projecting therefrom in concentric relation to said common tangent, a spring anchor extending into an interstice between adjacent turns of said spring to anchor the latter, means for rotating said anchor relative to said spring to progress the anchor along the spring to vary the effective length thereof, adjustable support means for supporting said spring anchor and varying the position thereof along said common tangent, two pistons of different size concentric with said common tangent and connected to the other end of said cable with the smaller of the pistons located more nearly adjacent said drum element, means defining connected cylinders receiving said respective pistons and conforming generally in size thereto, two pliable sealing elements extending transversely across said respective pistons and having marginal edges secured and sealed to said cylinder defining means encircling said respective pistons, and the portion of each sealing element located radially inward of the adjoined cylinder defining means having a generally cylindrical shape and substantial length to radially support the adjacent piston while providing for unresisted axial movement thereof in said cylinder defining means.

6. A fluid pressure responsive, variable output pump comprising, in combination, a rotatable control element, variable rate pumping means controlled by said element, a drum element, a driving clutch element connected to said drum element, a driven clutch element connected to said control element and biased into engagement with said driving clutch element, handle means on said driven clutch element for disengaging the latter from said driving clutch element and rotating said control element independently of said drum, rotary position indicator means connected with said control element, cable means encircling said drum element and having opposite ends extending in opposite directions from the periphery thereof along a common tangent thereto, a spring connected to one end of said cable and projecting therefrom in concentric relation to said common tangent, a spring anchor anchoring said spring means for changing the position of said anchor relative to said spring to vary the effective strength of the latter, two piston elements of different size concentric with said common tangent and connected to the other end of said cable with the smaller of the pistons located more nearly adjacent said drum, means defining connected cylinders receiving said respective pistons and conforming generally in size thereto, and two pliable sealing elements extending radially from said respective pistons to said cylinder defining means to provide frictionless floating support to said respective pistons.

7. A variable output pump responsive to the instantaneous pressure of a fluid control medium and comprising, in combination, variable output pumping means, a rotary control element connected to control the instantaneous output rate of said pumping means in accordance with the rotary position of the control element, means defining two interconnected cylinders of unequal size, two interconnected differential pistons disposed in said respective cylinders, flexible sealing elements extending radially between said respective pistons and the adjacent circumferential walls of said respective cylinders, each of said sealing elements including a flexible portion of generally cylindrical shape located between the adjacent piston and cylinder to radially support the coacting piston while providing for unresisted axial movement thereof, means for supplying a control fluid to said cylinders between said pistons to exert a differential pressure force thereon, spring means interconnected with said pistons to oppose the differential fluid pressure force on the latter, antifriction transmission means connected to said pistons to translate linear motion thereof into rotary motion, clutch means normally connecting said transmission to said control element, indicator means on said control element for indicating the instantaneous position thereof, and means for disengaging said clutch and rotating said control element independently of said transmission.

8. A fluid pressure responsive, variable rate pump comprising, in combination, a movable pump control element, means for pumping fluid at an adjustable rate determined by the position of said control element, means defining two generally concentric connected cylinders of unequal diameter, two connected pistons disposed in said respective cylinders, two flexible sealing elements extending between the peripheries of said respective pistons and the means defining said respective cylinders, each of said sealing elements being dimensioned to define a circumferential fold therein in which an outer portion of the sealing element is folded axially along an inner portion of the sealing element to provide for free floating axial movement of the coacting piston within the associated cylinder, means for admitting a control fluid under pressure into said cylinders between said pistons to produce a differential actuating force on said pistons, means connecting said pistons to said control element to urge the latter in one direction, a spring connected to oppose the differential pressure force on said pistons and urge said control element in a direction opposite from said one direction, a support coacting with said spring to support the latter against the reaction of said pistons, means for adjusting said support relative to said spring to adjust the effective spring constant of the latter to vary the resistance of the spring to progressive displacement of said control element by said pistons, and means for adjusting the position of the supported portion of said spring to adjust the residual force exerted by the spring on said pistons for a particular position of said control element.

9. A fluid pressure responsive, variable rate pump comprising, in combination, a movable pump control element, a fluid control motor including piston means therein responsive to the admission of a control fluid to the control motor to exert a translating force proportional to the pressure of the fluid admitted into said motor, a helical reaction spring connected to said piston means to yieldably oppose the force of fluid pressure on the piston means, a spring anchor coacting with said spring to anchor the latter against the force applied by said piston means, means for adjusting said anchor axially in relation to said spring to adjust the effective length and the effective spring constant of the portion of the spring which yieldably sustains the force of the piston means, substantially frictionless means connecting said piston means to said pump control element to position the latter in accordance with the position of said piston means; and means for adjusting said spring anchor to effect, through the reaction of said spring on said piston means, location of said control element in a desired position when said piston means is exposed to a particular pressure of fluid.

10. A variable output pump responsive to the instantaneous pressure of a fluid control medium and comprising, in combination, variable output pumping means, a movable control element connected to said pumping means to control the volumetric output rate of the latter in accordance with the position of the control element, means defining two interconnected cylinders of unequal size, two interconnected differential pistons disposed within said respective cylinders, flexible sealing elements extending radially between said respective pistons and the means defining the coacting cylinders, each of said sealing elements defining a circumferential axially extending fold providing for substantially unresisted axial movement of the coacting piston, means for supplying a control fluid to said cylinders between said pistons to exert a differential pressure force thereon, spring means interconnected with said pistons to yieldably oppose the differential fluid pressure force on the latter, and antifriction transmission means connecting said pistons to said control element to determine the position of the latter and hence the output rate of said pumping means in accordance with the position of said pistons.

11. A variable output pump controlled by the pressure of a fluid control medium and comprising, in combination, variable pumping means, a movable control element connected to said pumping means to control the output rate of the latter in accordance with the position of the control element, a rotary drum element connected in driving relation to said control element, a flexible actuating element encircling said drum and having opposite ends extending generally in opposite directions therefrom, a helical tension spring connected to one end of said actuating element to yieldably anchor the latter, a spring anchor projecting into an interstice between the adjacent turns of said spring to anchor the latter, means for rotating said anchor in relation to said spring to progress said anchor along said spring to vary the effective length of the spring between said anchor and said actuating element, a fluid control motor adapted to receive a control fluid under pressure and being connected to the end of said actuating element opposite from said spring to exert a tension force on said actuating element proportional to the pressure of control fluid admitted to said motor, and means for adjusting the position of said spring anchor to vary the position of said rotary control element for any particular fluid pressure applied to said control motor.

12. A variable output pump responsive to the instantaneous pressure of a fluid control medium and comprising, in combination, variable output pumping means, a movable control element connected to said pumping means to control the volumetric output rate of the latter in accordance with the position of the control element, means defining two interconnected cylinders of unequal size, two interconnected differential pistons disposed within said respective cylinders, sealing elements forming seals between said respective pistons and the means defining the coacting cylinders, means for supplying a control fluid to said cylinders between said pistons to exert a differential pressure force thereon, spring means interconnected with said pistons to oppose the differential fluid pressure force on the latter, antifriction transmission means connecting said pistons to said control element to determine the position of the latter and hence the output rate of said pumping means in accordance with the position of said pistons, and adjustable means coacting with said spring to vary the effective spring constant of the latter to adjust the relationship of the range within which the output rate of said pumping means is controlled in relation to the pressure range within which the pressure of the control fluid varies.

13. A fluid pressure responsive, variable rate pump comprising, in combination, a movable pump control element, a fluid control motor responsive to the admission of a control fluid to the control motor to exert a control force proportional to the pressure of the fluid admitted into said motor, a reaction spring connected to said motor to yieldably oppose the control force exerted by the latter, a spring support coacting with said spring to support the latter against the force applied by said control motor, means for adjusting said spring support in relation to said spring to adjust the effective length and the effective spring constant of the portion of the spring which yieldably sustains the force of said motor, and substantially frictionless transmission means connecting said spring to said pump control element to position the latter in accordance with the position occupied by said spring in establishing an equilibrium between the reaction of the spring and the control force of said motor.

14. A fluid pressure responsive, variable rate pump comprising, in combination, a rotary pump control element, means for pumping fluid at an adjustable rate determined by the position of said control element, means defining two generally concentric connected cylinders of unequal diameter, two connected pistons disposed in said respective cylinders, two flexible sealing elements extending between the peripheries of said respective pistons and the means defining said respective cylinders, each of said sealing elements being dimensioned to define a circumferential fold therein in which an outer portion of the sealing element is folded axially along an inner portion of the sealing element to provide for free floating axial movement of the coacting piston within the associated cylinder, means for admitting control fluid under pressure into said cylinders between said pistons to produce a differential actuating force on said pistons, a rotary drum element connected in driving relation to said pump control element, a flexible actuating element encircling said drum and having opposite ends extending generally in opposite directions therefrom, a spring connected to one end of said actuating element to yieldably anchor the latter, and means connecting said pistons to the end of said actuating element opposite from said spring to exert a tension force on said actuating element proportional to the pressure of control fluid admitted to said cylinders to position said control element in accordance with the position assumed by said pistons in establishing an equilibrium with said spring.

References Cited in the file of this patent

UNITED STATES PATENTS

| | | | |
|---|---|---|---|
| 335,033 | Locke | Jan. 26, | 1886 |
| 1,050,745 | Moore | Jan. 14, | 1913 |
| 1,233,371 | Ornstein | July 17, | 1917 |
| 2,252,939 | McCoy | Aug. 19, | 1941 |
| 2,458,821 | Anderson | Jan. 11, | 1949 |
| 2,722,889 | Wahlmark | Nov. 8, | 1955 |
| 2,820,434 | Otto | Jan. 21, | 1958 |
| 2,843,045 | Mashinter | July 15, | 1958 |
| 2,863,471 | Thurman | Dec. 9, | 1958 |
| 2,948,223 | Mashinter | Aug. 9, | 1960 |

FOREIGN PATENTS

| | | | |
|---|---|---|---|
| 445,867 | Great Britain | Apr. 16, | 1936 |